United States Patent
Wong et al.

(10) Patent No.: US 11,943,774 B2
(45) Date of Patent: Mar. 26, 2024

(54) SYSTEM AND METHOD FOR INDICATING A FIRST SET AND A SECOND SET OF UPLINK CHANNEL TRANSMISSION PARAMETERS

(71) Applicant: Sony Corporation, Tokyo (JP)

(72) Inventors: Shin Horng Wong, Basingstoke (GB); Martin Warwick Beale, Basingstoke (GB); Kazuyuki Shimezawa, Basingstoke (GB); Yassin Aden Awad, Basingstoke (GB)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 17/261,871

(22) PCT Filed: Jul. 22, 2019

(86) PCT No.: PCT/EP2019/069658
§ 371 (c)(1),
(2) Date: Jan. 21, 2021

(87) PCT Pub. No.: WO2020/020815
PCT Pub. Date: Jan. 30, 2020

(65) Prior Publication Data
US 2021/0298054 A1    Sep. 23, 2021

(30) Foreign Application Priority Data
Jul. 25, 2018   (EP) ...................................  18185553

(51) Int. Cl.
*H04W 72/21* (2023.01)
*H04L 1/1607* (2023.01)
(Continued)

(52) U.S. Cl.
CPC ........... *H04W 72/21* (2023.01); *H04L 1/1664* (2013.01); *H04L 5/0012* (2013.01); *H04W 72/0446* (2013.01); *H04W 72/1273* (2013.01)

(58) Field of Classification Search
CPC ... H04L 1/0023; H04L 1/1664; H04L 5/0012; H04L 5/0023; H04L 5/0053;
(Continued)

(56) References Cited

U.S. PATENT DOCUMENTS 9,723,592 B2 * 8/2017 Kim ....................... H04L 1/1861
11,310,827 B2 * 4/2022 Bae ....................... H04L 5/0096
(Continued)

FOREIGN PATENT DOCUMENTS

| WO | WO-2017195702 A1 | 11/2017 |
| WO | WO-2017218785 A1 | 12/2017 |

(Continued)

OTHER PUBLICATIONS

U.S. Appl. No. 62/590,261, filed 2017.*
(Continued)

*Primary Examiner* — Dung B Huynh
(74) *Attorney, Agent, or Firm* — XSENSUS LLP

(57) ABSTRACT

A base station for a mobile telecommunications system has circuitry configured to communicate with at least one user equipment, wherein the circuitry is further configured to: indicate use of a first set of uplink channel transmission parameters and a second set of uplink channel transmission parameter for use the at least one user equipment for a data transmission.

19 Claims, 8 Drawing Sheets

(51) Int. Cl.
  *H04L 5/00* (2006.01)
  *H04W 72/0446* (2023.01)
  *H04W 72/1273* (2023.01)

(58) Field of Classification Search
  CPC ............ H04L 5/0091; H04W 72/0446; H04W 72/1273; H04W 72/1284; H04W 72/1289
  See application file for complete search history.

(56) References Cited

U.S. PATENT DOCUMENTS

| | | | |
|---|---|---|---|
| 2017/0171841 A1 | 6/2017 | Chen | |
| 2017/0367110 A1 | 12/2017 | Li | |
| 2018/0035459 A1* | 2/2018 | Islam | H04L 5/0053 |
| 2018/0103428 A1* | 4/2018 | Jiang | H04W 52/0225 |
| 2018/0124710 A1* | 5/2018 | Ly | H04L 5/0007 |
| 2018/0220415 A1* | 8/2018 | Yin | H04L 5/0094 |
| 2018/0279291 A1* | 9/2018 | Tiirola | H04L 1/1861 |
| 2018/0323909 A1* | 11/2018 | Ying | H04L 1/1822 |
| 2018/0324787 A1* | 11/2018 | Yin | H04L 5/0053 |
| 2018/0332567 A1* | 11/2018 | John Wilson | H04W 72/042 |
| 2018/0359711 A1* | 12/2018 | Akkarakaran | H04W 52/362 |
| 2018/0368117 A1* | 12/2018 | Ying | H04L 1/16 |
| 2019/0045546 A1* | 2/2019 | Li | H04L 5/0073 |
| 2019/0053211 A1* | 2/2019 | Ying | H04W 72/044 |
| 2019/0075524 A1* | 3/2019 | Zhou | H04W 16/32 |
| 2019/0158240 A1* | 5/2019 | Li | H04W 4/023 |
| 2019/0159219 A1* | 5/2019 | Hosseini | H04L 5/0091 |
| 2019/0190645 A1* | 6/2019 | Sano | H04L 5/0044 |
| 2019/0239167 A1* | 8/2019 | Liu | H04W 52/325 |
| 2019/0253137 A1* | 8/2019 | Sun | H04B 7/2643 |
| 2019/0254067 A1* | 8/2019 | Al-Imari | H04W 72/1268 |
| 2019/0260523 A1* | 8/2019 | Yang | H04L 1/0693 |
| 2019/0261229 A1* | 8/2019 | Singh | H04W 36/0044 |
| 2019/0268127 A1* | 8/2019 | Hosseini | H04L 5/0094 |
| 2019/0268938 A1* | 8/2019 | Zhao | H04W 48/16 |
| 2019/0280757 A1* | 9/2019 | Yang | H04B 7/0697 |
| 2019/0280802 A1* | 9/2019 | Ma | H04W 76/11 |
| 2019/0280841 A1* | 9/2019 | Fu | H04W 72/1273 |
| 2019/0306852 A1* | 10/2019 | Nayeb Nazar | H04W 4/70 |
| 2019/0313419 A1* | 10/2019 | Fakoorian | H04W 28/0278 |
| 2019/0320435 A1* | 10/2019 | Yu | H04W 72/1289 |
| 2019/0327687 A1* | 10/2019 | Wang | H04W 72/0473 |
| 2019/0335400 A1* | 10/2019 | Gong | H04W 52/146 |
| 2019/0349897 A1* | 11/2019 | Hosseini | H04W 72/042 |
| 2019/0349973 A1* | 11/2019 | Yang | H04W 72/1289 |
| 2019/0363843 A1* | 11/2019 | Gordaychik | H04L 1/1896 |
| 2019/0364563 A1* | 11/2019 | Jung | H04W 72/04 |
| 2019/0387538 A1* | 12/2019 | Du | H04W 72/0406 |
| 2019/0394082 A1* | 12/2019 | Cirik | H04W 72/046 |
| 2020/0008156 A1* | 1/2020 | Yin | H04L 1/1858 |
| 2020/0008177 A1* | 1/2020 | Huang | H04W 72/1242 |
| 2020/0008216 A1* | 1/2020 | Iyer | H04W 72/042 |
| 2020/0022112 A1* | 1/2020 | Yasukawa | H04L 5/0053 |
| 2020/0022117 A1* | 1/2020 | Dong | H04W 72/042 |
| 2020/0022133 A1* | 1/2020 | Yamamoto | H04W 52/146 |
| 2020/0037314 A1* | 1/2020 | Xiong | H04L 5/0091 |
| 2020/0037350 A1* | 1/2020 | Park | H04L 5/0053 |
| 2020/0045722 A1* | 2/2020 | Bae | H04L 5/0078 |
| 2020/0052864 A1* | 2/2020 | Hosseinian | H04L 25/02 |
| 2020/0059960 A1* | 2/2020 | Shimezawa | H04W 72/1205 |
| 2020/0059981 A1* | 2/2020 | Suzuki | H04W 76/15 |
| 2020/0068607 A1* | 2/2020 | Jiang | H04W 72/042 |
| 2020/0106557 A1* | 4/2020 | Wong | H04B 7/0413 |
| 2020/0128570 A1* | 4/2020 | Wong | H04W 72/0453 |
| 2020/0145173 A1* | 5/2020 | Lyu | H04W 72/0453 |
| 2020/0163081 A1* | 5/2020 | Kim | H04L 5/0057 |
| 2020/0187225 A1* | 6/2020 | Xia | H04L 5/0044 |
| 2020/0196343 A1* | 6/2020 | Marinier | H04L 1/1896 |
| 2020/0221444 A1* | 7/2020 | Tiirola | H04L 1/1812 |
| 2020/0229111 A1* | 7/2020 | Kim | H04W 76/27 |
| 2020/0252954 A1* | 8/2020 | Kim | H04L 1/0061 |
| 2020/0266922 A1* | 8/2020 | Zhang | H04L 5/0016 |
| 2020/0281012 A1* | 9/2020 | Behravan | H04W 72/1268 |
| 2020/0305095 A1* | 9/2020 | Lin | H04W 52/281 |
| 2020/0336249 A1* | 10/2020 | Yi | H04W 72/23 |
| 2020/0344025 A1* | 10/2020 | Shimomura | H04L 5/0091 |
| 2020/0344785 A1* | 10/2020 | Lin | H04W 72/1273 |
| 2020/0351896 A1* | 11/2020 | Taherzadeh Boroujeni | H04L 1/0061 |
| 2020/0359403 A1* | 11/2020 | Lee | H04W 72/21 |
| 2020/0374817 A1* | 11/2020 | Xue | H04W 52/146 |
| 2020/0374912 A1* | 11/2020 | Takeda | H04W 72/0446 |
| 2020/0396034 A1* | 12/2020 | Chou | H04L 1/0068 |
| 2020/0404692 A1* | 12/2020 | Yin | H04W 72/1284 |
| 2021/0014866 A1* | 1/2021 | Shi | H04L 5/0051 |
| 2021/0014880 A1* | 1/2021 | Jiang | H04W 72/1242 |
| 2021/0068059 A1* | 3/2021 | Yasukawa | H04W 52/247 |
| 2021/0084644 A1* | 3/2021 | Bae | H04W 72/21 |
| 2021/0105752 A1* | 4/2021 | Taherzadeh Boroujeni | H04L 1/0038 |
| 2021/0135825 A1* | 5/2021 | Pan | H04W 72/02 |
| 2021/0144700 A1* | 5/2021 | Lee | H04W 72/0413 |
| 2021/0160901 A1* | 5/2021 | Takeda | H04L 5/0053 |
| 2021/0176696 A1* | 6/2021 | Sebire | H04W 72/20 |
| 2021/0204282 A1* | 7/2021 | Lee | H04L 5/0053 |
| 2021/0211993 A1* | 7/2021 | Liu | H04W 52/343 |
| 2021/0235389 A1* | 7/2021 | Yao | H04W 52/242 |
| 2021/0266953 A1* | 8/2021 | Pelletier | H04W 72/1289 |
| 2021/0289523 A1* | 9/2021 | Li | H04W 56/0045 |
| 2021/0377991 A1* | 12/2021 | Takeda | H04L 1/001 |
| 2022/0039113 A1* | 2/2022 | Choi | H04N 7/15 |

FOREIGN PATENT DOCUMENTS

| | | |
|---|---|---|
| WO | WO-2018062377 A1 | 4/2018 |
| WO | WO-2018128970 A1 | 7/2018 |

OTHER PUBLICATIONS

U.S. Appl. No. 62/688,327, filed 2018.*
U.S. Appl. No. 62/669,941, filed 2018.*
International Search Report and Written Opinion dated Sep. 30, 2019, received for PCT Application No. PCT/EP2019/069658, Filed on Jul. 22, 2019, 11 Pages.
Interdigital Inc., "On eMBB and URLLC multiplexing in UL", 3GPP TSG RAN WG1 Meeting No. 92 R1-1802627, Athens, Greece, Feb. 26-Mar. 2, 2018, 4 pages.
Samsung, "Multiplexing of UL Transmissions with Different Reliability Requirements", 3GPP TSG RAN WG1 Meeting No. 92 R1-1802002, Athens, Greece, Feb. 26-Mar. 2, 2018, pp. 1-7.
Xiaomi, "On UL multiplexing of transmission with different reliability requirements", 3GPP TSG RAN WG1 Meeting No. 92bis R1-1804945, Sanya, China, Apr. 16-20, 2018, 3 pages.
NTT Docomo Inc., "Necessity of compact DCI", 3GPP TSG RAN WG1 Meeting No. 92 R1-1802494, Athens, Greece, Feb. 26-Mar. 2, 2018, pp. 1-6.
Intel Corporation, "Handling UL transmissions with different reliability requirements", 3GPP TSG RAN WG1 Meeting No. 92bis R1-1804742, Sanya, P.R. China, Apr. 16-20, 2018, pp. 1-8.
3GPP TR 38.913, "3rd Generation Partnership Project; Technical Specification Group Radio Access Network; Study on Scenarios and Requirements for Next Generation Access Technologies; (Release 14)", V14.2.0, Mar. 2017, total 387 pages.
ETSI TS 138 212, "5G; NR; Multiplexing and channel coding (3GPP TS 38.212 version 15.6.0 Release 15)", V15.6.0, Jul. 2019, total 106 pages.
NTT Docomo, Inc., "Revised WID on New Radio Access Technology", 3GPP TSG RAN Meeting #78, RP-172834, revision of RP-172115, Dec. 18-21, 2017, total 11 pages, Lisbon, Portugal.
ZTE, Sanechips,Study of handling UL multiplexing of transmissions with different reliability requirements, 3GPP TSG RAN WG1 #92 R1-1801634, Feb. 16, 2018.
Wilus Inc., Intra-UE UL multiplexing considering URLLC data in PUSCH, 3GPP TSG RAN WG1 #93 R1-1807235, May 12, 2018.
Vivo, Discussion on eMBB and URLLC UCI multiplexing, 3GPP TSG RAN WG1 #93 R1-1806064, May 12, 2018.
Sony, Considerations on UL pre-emption, 3GPP TSG RAN WG1 #92b R1-1804600, Apr. 6, 2018.

(56) References Cited

OTHER PUBLICATIONS

ETRI, Remaining Issues On DL Data Multiplexing With Different Reliability Requirements, 3GPP TSG RAN WG1 #93 R1-1806668, <URL:http://www.3gpp.org/ftp/tsg_ran/WG1_RL1/TSGR1_93/Docs/R1-1806668.zip>.

* cited by examiner

SYSTEM AND METHOD FOR INDICATING A FIRST SET AND A SECOND SET OF UPLINK CHANNEL TRANSMISSION PARAMETERS

CROSS-REFERENCE TO RELATED APPLICATIONS

The present application is based on PCT filing PCT/EP2019/069658, filed Jul. 22, 2019, which claims priority to EP 18185553.7, filed Jul. 25, 2018, the entire contents of each are incorporated herein by reference.

TECHNICAL FIELD

The present disclosure generally pertains to base stations, user equipment, circuitry, system and method for a mobile telecommunications system.

TECHNICAL BACKGROUND

Several generations of mobile telecommunications systems are known, e.g. the third generation ("3G"), which is based on the International Mobile Telecommunications-2000 (IMT-2000) specifications, the fourth generation ("4G"), which provides capabilities as defined in the International Mobile Telecommunications-Advanced Standard (IMT-Advanced Standard), and the current fifth generation ("5G"), which is under development and which might be put into practice in the year 2020.

A candidate for providing the requirements of 5G is the so-called Long Term Evolution ("LTE"), which is a wireless communications technology allowing high-speed data communications for mobile phones and data terminals and which is already used for 4G mobile telecommunications systems. Other candidates for meeting the 5G requirements are termed New Radio (NR) Access Technology Systems. An NR can be based on LTE technology, just as some aspects of LTE were based on previous generations of mobile communications technology.

The 3GPP Rel-15 New Radio (NR) Access Technology Work Item, whose objectives are defined in RP-172834, "Work Item on New Radio (NR) Access Technology," NTT DOCOMO, RAN #78, Lisbon, Portugal, Dec. 18-21, 2017, specifies the $5^{th}$ generation or 5G radio access network, and specifies two NR functionalities, namely:

Enhanced Mobile Broadband (eMBB), and

Ultra Reliable & Low Latency Communications (URLLC), wherein eMBB services are characterized by high capacity with a requirement to support up to 20 Gb/s. For efficient transmission of large amounts of data at high throughput, eMBB requires a long scheduling time so as to minimize the overhead used (where the "scheduling time" we refer to is the time to allocate and transmit a data packet). The URLLC data is expected to be short and hence a short scheduling time where the control and data have short duration are required within a frame duration that is significantly less than that of the eMBB frame.

Moreover, according to 3GPP document ETSI TR 138 913, V14.2.0 (2017-05), "3G; Study on Scenarios and Requirements for Next Generation Access Technologies (3GPP TR 38.913 version 14.2.0 Release 14)", two important requirements for URLLC are:

Low latency: The required latency measured from the ingress of a layer 2 packet to its egress from the network, is at most 1 ms.

Reliability: The requirement for URLLC is a reliability of $1\text{-}10^5$ (99.999%) for one transmission of a 32 byte packet.

Generally, it is known to pre-empt resources of an ongoing transmission, such as eMBB, such that pre-empted resources can be used for low latency transmission such as URLLC Furthermore, it is envisaged that control channels such as PDCCH (Physical Downlink Control Channel) and PUCCH (Physical Uplink Control Channel) carry scheduling and feedback information for URLLC transmission and that PDSCH (Physical Downlink Shared Channel) and PUSCH (Physical Uplink Shared Channel) carry the URLLC packets.

Although there exist techniques for transmission of URLLC data, it is generally desirable to improve the existing techniques.

SUMMARY

According to a first aspect, the disclosure provides a base station for a mobile telecommunications system comprising circuitry configured to communicate with at least one user equipment, wherein the circuitry is further configured to indicate the use of a first set of uplink channel transmission parameters and a second set of uplink channel transmission parameters for use by the at least one user equipment for a data transmission.

According to a second aspect, the disclosure provides a user equipment for a mobile telecommunications system comprising circuitry configured to communicate with at least one base station, wherein the circuitry is further configured to receive an indication of use of a first set of uplink channel transmission parameters and a second set of uplink channel transmission parameters for a data transmission.

According to a third aspect, the disclosure provides a circuitry for a base station for a mobile telecommunications system configured to communicate with at least one user equipment, wherein the circuitry is further configured to indicate use of a first set of uplink channel transmission parameters and a second set of uplink channel transmission parameter for use by the at least one user equipment for a data transmission.

According to a fourth aspect, the disclosure provides a circuitry for a user equipment for a mobile telecommunications system configured to communicate with at least one base station, wherein the circuitry is further configured to receive an indication of use of a first set of uplink channel transmission parameters and a second set of uplink channel transmission parameters for a data transmission.

According to a fifth aspect, the disclosure provides a mobile telecommunications system configured to provide communication between at least one base station and at least one user equipment, wherein the at least one base station comprises circuitry configured to indicate use of a first set of uplink channel transmission parameters and a second set of uplink channel transmission parameter for use by the at least one user equipment for a data transmission, and wherein the at least one user equipment comprises circuitry configured to receive an indication of use of a first set of uplink channel transmission parameters and a second set of uplink channel transmission parameters for the data transmission.

According to a sixth aspect, the disclosure provides a mobile telecommunications system method for providing communication between at least one base station and at least one user equipment, comprising indicating use of a first set of uplink channel transmission parameters and a second set of uplink channel transmission parameter for use by the at least one user equipment for a data transmission; or receiving an indication of use of a first set of uplink channel transmission parameters and a second set of uplink channel transmission parameters for the data transmission.

Further aspects are set forth in the dependent claims, the following description and the drawings.

BRIEF DESCRIPTION OF THE DRAWINGS

Embodiments are explained by way of example with respect to the accompanying drawings, in which.

DETAILED DESCRIPTION OF EMBODIMENTS

Figure 3:
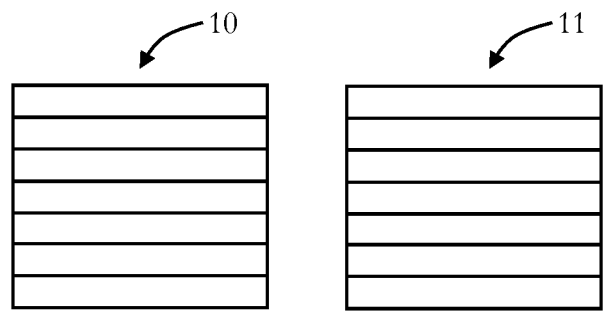
FIG. 3 illustrates an embodiment of the present disclosure.

Before a detailed description of the embodiments under reference of FIG. 3 is given, general explanations are made.

As mentioned in the outset, in general, several generations of mobile telecommunications systems are known, e.g. the third generation ("3G"), which is based on the International Mobile Telecommunications-2000 (IMT-2000) specifications, the fourth generation ("4G"), which provides capabilities as defined in the International Mobile Telecommunications-Advanced Standard (IMT-Advanced Standard), and the current fifth generation ("5G"), which is under development and which might be put into practice in the year 2020.

One of the candidates for meeting the 5G requirements are termed New Radio (NR) Access Technology Systems. Some aspects of NR can be based on LTE technology, in some embodiments, just as some aspects of LTE were based on previous generations of mobile communications technology.

As mentioned in the outset, two new functionalities for the New Radio (NR) Access Technology, which are discussed, are Enhanced Mobile Broadband (eMBB) and Ultra Reliable & Low Latency Communications (URLLC) services.

Figure 1:
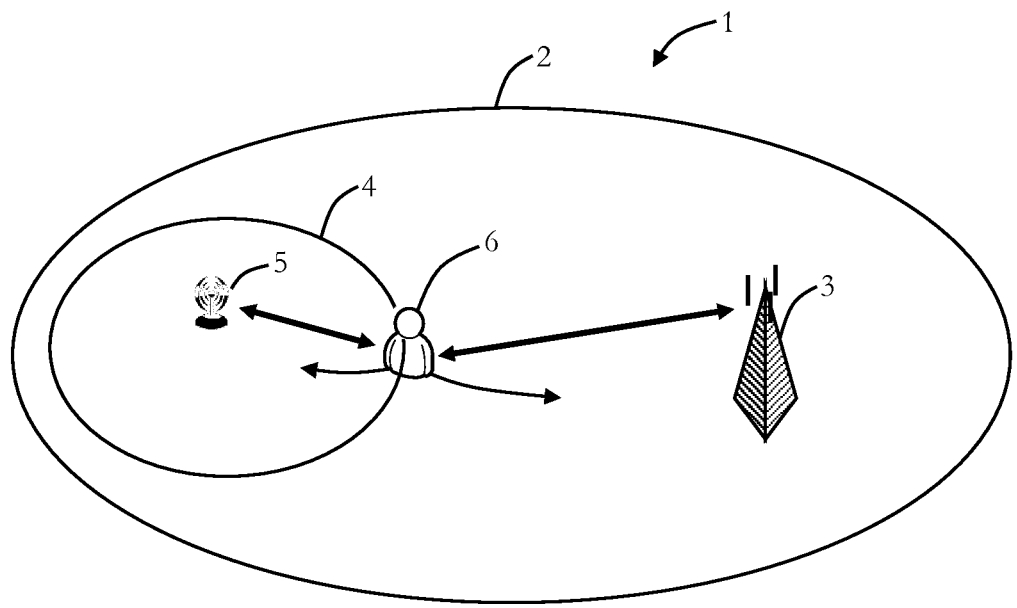
FIG. 1 illustrates an embodiment of a radio access network.

A typical embodiment of an NR radio access network RAN 1 is illustrated in FIG. 1. The RAN 1 has a macro cell 2, which is established by an LTE eNodeB 3, and an NR cell 4, which is established by an NR eNodeB 5 (also referred to as gNB (next generation eNodeB)).

A UE 6 can communicate with the LTE eNodeB 3 and, as long as it is within the NR cell 4, it can also communicate with the NR eNodeB 5.

As mentioned, eMBB services are characterized in some embodiments by high capacity with a requirement to support up to 20 Gb/s. For efficient transmission of large amounts of data at high throughput, eMBB requires a long scheduling time so as to minimize the overhead used (wherein, in some embodiments, the "scheduling time" is the time to allocate and transmit a data packet).

In some embodiments, as mentioned, a requirement for URLLC is low latency measured from the ingress of a layer 2 packet to its egress from the network, with a proposed target of 1 ms, without limiting the present disclosure in that regard, and another requirement for URLLC is a reliability of $1\text{-}10^5$ (99.999%) for one transmission of a 32 byte packet. The URLLC data may be expected to be short and hence a short scheduling time where the control and data have short duration are required in some embodiments within a frame duration that is significantly less than that of the eMBB frame.

In some embodiments, the reliability aspect of URLLC is addressed through the use of LDPC codes (Low Density Parity Check codes), low coding rates (with low spectral efficiency), high aggregation levels for control channels and the support of multiple antennas at both the transmitter and receiver. Introduction of a new CQI table (Channel Quality Indicator), having entries with low spectral efficiency, allows URLLC to operate in a spectrally efficient manner, in some embodiments, where the scheduled modulation and coding scheme (MCS) can be chosen to meet the reliability criteria in the current channel conditions.

Figure 2:
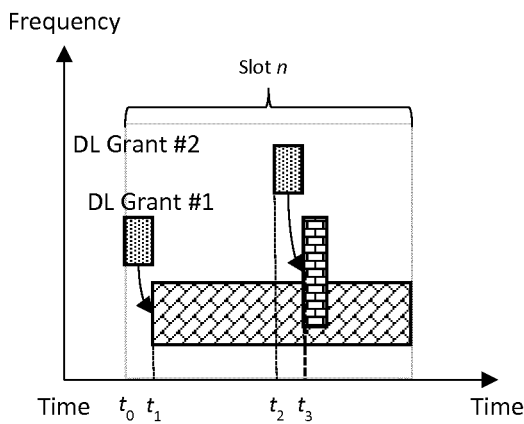
FIG. 2 illustrates pre-emption of an eMBB transmission by a URLLC transmission.

Another aspect, in some embodiments, of URLLC operation for a UE is that the URLLC transmission may pre-empt an existing transmission, in particular if the ongoing transmission is of lower priority, e.g. an enhanced Mobile Broadband (eMBB) transmission that is typically more delay tolerant than a URLLC transmission. Such a pre-emption may occur within or for the same UE. An example is illustrated in FIG. 2, where at time to (abscissa, ordinate shows frequency) in a Slot n, the gNB (5, see exemplary FIG. 1) transmits a DCI (Downlink Control Information) carrying a DL Grant #1 to schedule a PDSCH (Physical Downlink Shared Channel) for an eMBB transmission at time $t_1$. At time $t_2$, a URLLC packet arrives for another UE and since it has a low latency, the gNB transmits a DL Grant #2 to schedule another PDSCH for this URLLC transmission at time $t_3$ in the same slot, i.e. Slot n. In this case, there are not sufficient resources available and, thus, the gNB schedules the URLLC transmission to occupy some of the resources originally scheduled for the eMBB transmission, which started at time $t_1$, thereby pre-empting this eMBB transmission.

In some embodiments, the physical channels involved in the transmission of URLLC may be enhanced to ensure that the URLLC requirements are met. It has been recognized that apart from improving the reliability and latency for the data channels, such as PDSCH (Physical Downlink Shared Channel) and PUSCH (Physical Uplink Shared Channel), that carry the URLLC packet, the control channels such as PDCCH (Physical Downlink Control Channel) and PUCCH (Physical Uplink Control Channel) that carry the scheduling and feedback for URLLC transmission are improved in some embodiments.

In Rel-15, at the physical layer, the PDSCH or PUSCH packets are not differentiated by their service. That is at the physical layer the UE is unaware whether the DL grant for a PDSCH or UL grant for a PUSCH is for a URLLC or an eMBB transmission. However, in Rel-15, separate MCS (Modulation and Coding Scheme) tables for PDSCH and PUSCH are introduced for URLLC, wherein the entries in these MCS tables include low spectral efficiency MCS, which are targeted at high reliability transmission. Thus, in some embodiments, the network can configure the UE to use one of these high reliability MCS tables and additionally, the UE can also be configured with a separate RNTI (Radio Network Temporary Identifier), where a DCI (Downlink Control Information) with CRC (Cyclic Redundancy Check) masked with this RNTI would indicate to the UE to use the high reliability MCS table rather than the normal MCS table for its transmissions. The use of a different RNTI therefore implicitly allows some level of service (URLLC or eMBB) awareness at the physical layer in some embodiments.

Thus, some embodiments pertain to enhancements in transmitting the uplink channels PUSCH and PUCCH if the UE is aware that the grant is for a URLLC packet. In some embodiments, it is assumed that the URLLC service is known either implicitly (e.g. through the use of a different MCS table) or explicitly.

Consequently, some embodiments pertain to a base station for a mobile telecommunications system comprising circuitry configured to communicate with at least one user equipment, wherein the circuitry is further configured to indicate use of a first set of uplink channel transmission parameters and a second set of uplink channel transmission parameters for use by the at least one user equipment for a data transmission, wherein, for example, the first and second sets of uplink channel transmission parameters differ from each other and/or are independent of each other.

Some embodiments pertain to a user equipment for a mobile telecommunications system comprising circuitry configured to communicate with at least one base station, wherein the circuitry is further configured to receive an indication of use of a first set of uplink channel transmission parameters and a second set of uplink channel transmission parameters for a data transmission, wherein, for example, the first and second sets of uplink channel transmission parameters differ from each other and/or are independent of each other.

In this specification, an eMBB transmission is an example for a "long data transmission" (or "long term transmission") and a URLLC transmission is an example for a "short data transmission" (or "short term transmission"). The data transmission may be an uplink or a downlink transmission and it may be short data or a long data transmission, it may be a control (data) transmission, and, thus, it is not limited to user data, but covers also control data or other data. The data transmission may be or may not be carried by a PUSCH, PUCCH or a PDSCH, PDCCH, without limiting the present disclosure in that regard.

The base station may be based on the principles of LTE (LTE-A) and/or it may be based on NR RAT, as also discussed above. The base station may be based on the known eNodeB of LTE, as one example, or it may be based on the discussed NR gNodeB. The user equipment may be, for example, a mobile phone, smartphone, a computer, tablet, tablet personal computer, or the like, including a mobile communication interface, or any other device which is able to perform a mobile telecommunication via, for example, LTE or NR, such as a hot spot device with a mobile communication interface, etc.

In some embodiments, the data transmission is an uplink data transmission from the user equipment to a base station and, additionally, it may be a short data transmission or a long data transmission, as mentioned above.

In some embodiments, the first set of uplink channel transmission parameters refers to a short data transmission and the second set of uplink channel transmission parameters refers to a long data transmission. Hence, by indicating (by the base station) whether the first set or the second set of uplink channel transmission parameters is to be used by the user equipment, the user equipment can use a corresponding set of uplink channel transmission parameters which is adapted to the short data or to the long data transmission.

The first and/or the second set of uplink channel transmission parameters may be predefined or it may be (dynamically) configured by the network.

The indication indicates which or both of the first set and the second set of uplink channel transmission should be use by the user equipment for the data transmission.

In some embodiments, the use of the first set and the second set of uplink channel transmission parameters is explicitly or implicitly indicated (by the base station) based on, for example at least one of the following: radio network temporary identifier, downlink control information format, physical downlink control channel control resource set, search space, usage of grant free resource for a physical uplink shared channel, occupation of number of slots, radio resource control. Hence, the user equipment can receive such an indication and based on the indication it determines which of the sets of uplink channel transmission parameters is to be used for its data transmission.

In some embodiments, the use of the first set and the second set of uplink channel transmission parameters is implicitly indicated (by the base station) based on a signaled physical uplink control channel resource and based on at least one of the following: physical uplink control channel resource set identification, physical uplink control channel resource identification, group of resource identifications. Hence, the user equipment can receive such an implicit indication and based on the indication it determines which of the sets of uplink channel transmission parameters is to be used for its data transmission.

As will also become apparent from the following discussion, in some embodiments, by indicating which of the first and second set of uplink channel transmission parameters is to be used, it is also (indirectly or implicitly) indicated that the (or at least one) parameters of the first or second set of uplink channel transmission parameters are to be used. For instance, if the first set of uplink channel transmission parameters is indicated to be used, the parameters (or at least one parameter) included in the first set of uplink channel transmission parameters are to be used and if the second set of uplink channel transmission parameters is indicated to be used, the parameters (or at least one parameter) included in the second set of uplink parameters are to be used.

The set of uplink channel transmission parameters and/or the parameters itself may be configured in an RRC connection setup in some embodiments.

In some embodiments, the indication of the use of the first and second set of uplink channel transmission parameters indicates a power control parameter, which is included in the first and/or second set of uplink channel transmission parameters, wherein the first and second sets of uplink channel transmission parameters are associated with a power control parameter, e.g. different power control parameters (a first for the first set and a second power control parameter for the second set of uplink channel transmission parameters, wherein the first and the second power control parameter may be different). Hence, the user equipment can, for example, adapt a transmission power based on the indication received from the base station, such that, e.g., for the short data transmission and the long data transmission different power control parameters are used. In some embodiments, the power control parameter is associated with the indicated use of the first and second set of uplink channel transmission parameters. For instance, if the use of the first set of uplink channel transmission parameters is indicated, a first power control parameter is used, wherein a second power control parameter is used, if the use of the second set of uplink channel transmission parameters is indicated.

In some embodiments, the first and the second sets of uplink channel transmission parameters are associated with different physical uplink control channel resources, such that, for example, the user equipment may use respective different physical uplink control channel resources based on the indication and, thus, e.g., different physical uplink control channel resources for the short data and the long data transmission.

In some embodiments, the indication of the use of the first and second set of uplink channel transmission parameters indicates a repetition to be used in an uplink or a downlink transmission (e.g. the first and second sets of uplink channel transmission parameters are associated with a repetition to be used in an uplink or a downlink transmission, e.g. a first repetition for the first set and a second repetition for the second set of uplink channel transmission parameters), which might be included in or associated with the first and/or second set of uplink channel transmission parameters, such that the user equipment can apply an according repetition, for example, of PUCCH/PUSCH or PDCCH/PDSCH candidates.

In some embodiments, the indication of the use of the first and second set of uplink channel transmission parameters indicates a delay for at least one of a physical downlink shared channel and an physical uplink control channel (e.g. the first and second sets of uplink channel transmission parameters are associated with a delay for at least one of: physical downlink shared channel and physical uplink control channel, e.g. a first delay for the first set and a second delay for the second set of uplink channel transmission parameters), which might be included in or associated with the first and/or second set of uplink channel transmission parameters, such that user equipment may apply an according delay for the data transmission in response to the detected or determined indication, e.g., different delays for the short data and the long data transmission. The delay may be such applied that a delay (time interval) is caused (introduced) between the physical downlink shared channel and the physical uplink control channel.

In some embodiments, the indication of the use of the first and second set of uplink channel transmission parameters indicates frequency hopping parameters (e.g. the first and second sets of uplink channel transmission parameters are associated with a frequency hopping pattern, e.g. a first frequency hopping pattern for the first set and a second frequency hopping pattern for the second set of uplink channel transmission parameters), which might be included in or associated with the first and/or second set of uplink channel transmission parameters, such that the user equipment may apply an according frequency hopping pattern for the data transmission in response to the determined indication, e.g., different frequency hopping switching frequency for the short data and the long data transmission.

In some embodiments, the indication of the use of the first and second set of uplink channel transmission parameters indicates a transmit diversity scheme (e.g. the first and second sets of uplink channel transmission parameters are associated with a transmit diversity scheme, e.g. a first transmit diversity scheme for the first set and a second transmit diversity scheme for the second set of uplink channel transmission parameters), which might be included in or associated with the first and/or second set of uplink channel transmission parameters, such that the user equipment may apply transmit diversity for the data transmission in a manner according to the determined indication. For example, the user equipment may apply a different number of transmit antennas for the short data and the long data transmission or may apply a different mapping between transmit antennas and reference signals for the short data and long data transmissions.

In some embodiments, the indication of the use of the first and second set of uplink channel transmission parameters indicates whether piggybacking is used, which might be included in or associated with the first and/or second set of uplink channel transmission parameters, such that the user equipment may decide on the basis of the indication, whether piggybacking is used in the data transmission, such as the short data or long data transmission.

In some embodiments, the usage of piggybacking of uplink control information is indicated, which might be included in or associated with the first and/or second set of uplink channel transmission parameters, such that the user equipment may decide on the basis of the indication, whether uplink control information is piggybacked in the data transmission or not.

In some embodiments, piggybacking of uplink control information onto the data transmission is not used (by the user equipment) if the use of the first set of uplink channel transmission parameters is indicated for the data transmission.

In some embodiments, piggybacking of uplink control information is used (by the user equipment) if the use of the first set of uplink channel transmission parameters is indicated for the data transmission and the amount of uplink control information is below a threshold. The threshold may be indicative of a number of bits and, for example, if the number of bits of the uplink control information is below the threshold, the user equipment decides to piggyback the uplink control information.

In some embodiments, piggybacking of uplink control information is not used or rejected (by the user equipment) when use of the first set of uplink channel transmission parameters is indicated and when the uplink control information is carried by a physical uplink control channel using the second set of uplink channel transmission parameters. For instance, in LTE, when a UCI carried by a PUCCH collides with a PUSCH transmission in the same UE, the UCI information is added to the PUSCH transmission, i.e. piggybacked. However, as a short data transmission such as URLLC, requires high reliability, piggybacking additional information may reduce its performance, and, thus, if the use of the first set of uplink channel transmission parameters is indicated, piggybacking is rejected.

In some embodiments, piggybacking of uplink control information is used (by the user equipment) when the use of the first set of uplink channel transmission parameters is indicated for the data transmission and when the uplink control information is carried by a physical uplink control channel using the first set of uplink channel transmission parameters. For example, when a PUCCH collides with a PUSCH in the same UE and the PUSCH uses the $1^{st}$ set of uplink channel transmission parameters, piggybacking of the UCI onto the PUSCH is accepted if the UCI is carried by a PUCCH using the $1^{st}$ set of uplink channel transmission parameters.

In some embodiments, when two physical uplink shared channels collide (in the user equipment), the physical uplink shared channel using the first set of uplink channel transmission parameters has priority over the physical uplink shared channel using the second set of uplink channel transmission parameters, such that the user equipment may prioritize the PUSCH using the first set of uplink channel transmission parameters. In one prioritization scheme, the PUSCH using the first set of uplink channel transmission parameters is transmitted and the PUSCH using the second set of uplink transmission parameters is not transmitted. In another prioritization scheme, the power applied to the PUSCH using the first set of uplink channel transmission parameters is increased relative to the power applied to the PUSCH using the second set of uplink channel transmission parameters.

In some embodiments, wherein, when two physical uplink shared channels collide and the two physical uplink shared channels use the first set of uplink channel transmission parameters, the later physical uplink shared channel has priority over the earlier physical uplink shared channel, such that the user equipment may prioritize the later physical uplink shared channel. In one prioritization scheme, the later PUSCH is transmitted and the earlier PUSCH is not transmitted. In another prioritization scheme, the power applied to the later PUSCH is increased relative to the power applied to the earlier PUSCH.

In some embodiments, when two physical uplink control channels collide (in the user equipment), the physical uplink control channel using the first set of uplink channel transmission parameters has priority over the physical uplink control channel using the second set of uplink channel transmission parameters, such that the user equipment may prioritize the PUCCH using the first set of uplink channel transmission parameters. In one prioritization scheme, the PUCCH using the first set of uplink channel transmission parameters is transmitted and the PUCCH using the second set of uplink transmission parameters is not transmitted. In another prioritization scheme, the power applied to the PUCCH using the first set of uplink channel transmission parameters is increased relative to the power applied to the PUCCH using the second set of uplink channel transmission parameters.

In some embodiments, when two physical uplink control channels using the first set of uplink channel transmission parameters collide (in the user equipment), uplink control information of both physical uplink control channels are jointly coded (by the user equipment) into a single physical uplink control channels transmission.

Some embodiments pertain to a circuitry for a base station, as described herein, for a mobile telecommunications system configured to communicate with at least one user equipment, wherein the circuitry is further configured to indicate use of a first set of uplink channel transmission parameters and a second set of uplink channel transmission parameter for use by the at least one user equipment for a data transmission, as discussed herein.

Some embodiments pertain to a circuitry for a user equipment, as described herein, for a mobile telecommunications system configured to communicate with at least one base station, wherein the circuitry is further configured to receive an indication of use of a first set of uplink channel transmission parameters and a second set of uplink channel transmission parameters for a data transmission, as discussed herein.

Some embodiments pertain to a mobile telecommunications system, as described herein, configured to provide communication between at least one base station and at least one user equipment, wherein the at least one base station, as discussed herein, comprises circuitry configured to indicate use of a first set of uplink channel transmission parameters and a second set of uplink channel transmission parameter for use by the at least one user equipment for a data transmission, and wherein the at least one user equipment, as discussed herein, comprises circuitry configured to receive an indication of use of a first set of uplink channel transmission parameters and a second set of uplink channel transmission parameters for the data transmission.

Some embodiments pertain to a mobile telecommunications system method for providing communication between at least one base station and at least one user equipment, including: indicating use of a first set of uplink channel transmission parameters and a second set of uplink channel transmission parameter for use by the at least one user equipment for a data transmission, as discussed herein; and or receiving an indication of use of a first set of uplink channel transmission parameters and a second set of uplink channel transmission parameters for the data transmission, as discussed herein.

Returning back to FIG. 3, there is illustrated the basic principle used in some embodiments, namely to provide at least two sets of uplink channel transmission parameters 10, 11, one (first) set 10 for PUSCH & PUCCH and another 11 for PUSCH & PUCCH (in other embodiments further sets of parameters may be provided). The first set of uplink transmission parameters is targeted at and used for a URLLC transmission, i.e. with low latency and high reliability, whereas the second set 11 of uplink transmission parameters is targeted at and used for non-URLLC transmission, e.g. eMBB. The transmission parameters and/or its values in the $1^{st}$ 10 and $2^{nd}$ 11 sets are different. Other transmission parameters not defined in the $1^{st}$ and $2^{nd}$ sets are common for both URLLC and eMBB transmissions.

Figure 4:
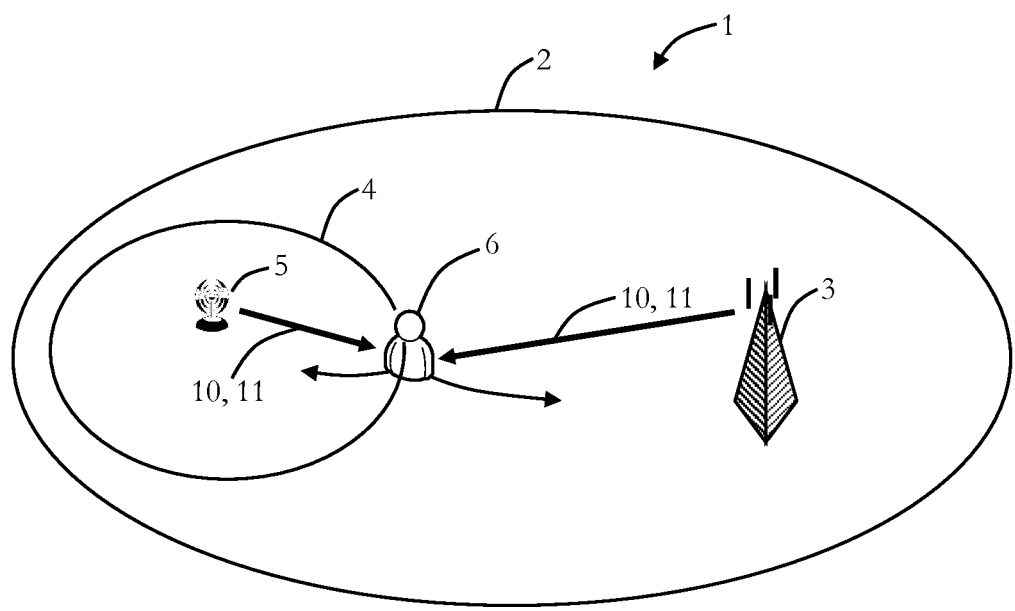
FIG. 4 illustrates an embodiment of a radio access network where a first and a second set of uplink channel transmission parameters are indicated.

As illustrated in FIG. 4, which shows the same RAN 1 as illustrated in FIG. 1 and explained above, the LTE eNodeB 3 and/or the gNB 5 may transmit the first and second sets of uplink transmission parameters to the UE 6 and/or may indicate to the UE 6 whether to use the first 10 or second 11 set of uplink transmission parameters.

The sets of uplink channel transmission parameters to be used are indicated using one or more of the following possibilities in some embodiments:

Different RNTI: that is the first set of uplink channel parameters are implicitly indicated using an RNTI that is different to that used by the second set of uplink channel parameters.

DCI Format: A different DCI format is used when the first set is to be used from when the second set is to be used.

PDCCH control resource set (CORESET)/search space: the sets of uplink channel parameters are implicitly indicated by the CORESET and/or search space in which a PDCCH is detected. The sets of uplink channel transmission parameters corresponding to CORESETs and/or search spaces can be indicated using RRC signalling. For example, if a PDCCH is received in a first CORESET, the first set of uplink channel parameters is used whereas if a PDCCH is received in a second CORESET, the second set of uplink channel parameters is used.

Grant free resource space: some grant free resources are associated with the first set of uplink channel parameters and other grant free resources are associated with the second set of uplink channel parameters. The set of uplink channel parameters to use then depends on the grant free resources used for the PUSCH transmission. In an example different grant free resources are used for URLLC and eMBB and the different grant free resources are associated with different uplink channel parameters.

The scheduled PDSCH/PUSCH occupies a predetermined number of mini-slots, e.g. if the scheduled PDSCH/PUSCH occupies, e.g. two mini-slots then it uses the $1^{st}$ set of parameters otherwise it uses the $2^{nd}$ set of parameters The sets can be implicitly indicated via the PUCCH resource that the UE is signalled to use. The linkage between PUCCH resources and set of uplink transmission parameters can be based on one or more of the following in some embodiments:

PUCCH resource set ID. There are up to four PUCCH resource sets. The PUCCH resource set that the UE is to use is signalled via RRC (Radio Resource Control).

A group of resource IDs (within a PUCCH resource set) that is indicated using DCI or PDCCH, wherein either the Resource IDs associated with some PDCCH CCEs (control channel elements) are associated with one set of uplink transmission parameters (certain PUCCH resource IDs within the PUCCH resource set are associated with PDCCH that start at a certain CCE), or Resource IDs associated with certain 'PUCCH resource indication' DCI bits are associated with one set of uplink transmission parameters (the 'PUCCH resource indication' is provided in a 3 bit field within the DCI). As an example of the use of the PUCCH resource indication, if these 3 bits indicate a value between '000' and '011', the first set of uplink transmission parameters is used, otherwise the second set of uplink transmission parameters is used.

The linkage between PUCCH resources and set of uplink transmission parameters can also be based on PUCCH resource ID. There are up to 128 PUCCH resource IDs. Some resource IDs (e.g. resource IDs 0→63) can be associated with the first set of uplink transmission parameters, some resource IDs (e.g. resource IDs 64→127) with the second set of uplink transmission parameters.

The set of parameters may also be indicated based on RRC configuration: The network RRC-configures which set of uplink channel transmission parameters to use.

Figure 5:
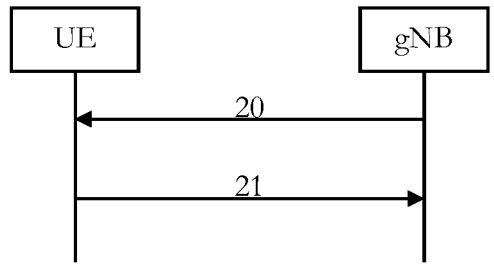
FIG. 5 illustrates an embodiment, where a power control offset parameter is indicated based on the indication of the first and second set of uplink channel transmission parameters.

In an embodiment, as illustrated in FIG. 5, the said different sets 10, 11 of uplink channel transmission parameters indicate a power control offset parameter. When the UE is indicated at 20 to use the first set of uplink channel transmission parameters, the transmission power of the PUSCH or PUCCH is increased by the power control offset parameter amount. For example, if the RNTI indicates that the transmission is to use the first set of uplink channel transmission parameters, a power control offset of 3 dB is applied to the uplink transmission at 21 by the UE. The one or more power control offsets can be RRC configured by the network.

Figure 6:
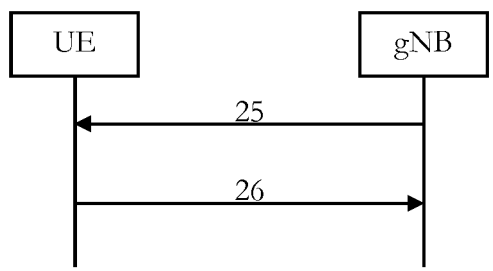
FIG. 6 illustrates an embodiment, where a repetition for an uplink is indicated based on the indication of the first and second set of uplink channel transmission parameters.

In another embodiment, as illustrated in FIG. 6, the different sets of uplink channel transmission parameters or the indication of them are used to apply repetitions to the uplink channel. That is, if the UE is indicated at 25 to use the first set of parameters, the PUSCH or PUCCH is repeated by a predetermined number. This predetermined repetition number or set of predetermined repetition numbers can be RRC configured by the network or it can be tied to MCS level. In the case where a plurality of predetermined repetition numbers are configured, an additional field in the DCI can indicate which repetition number is used, wherein a new DCI format or field is used. In other embodiments, instead of using a new DCI format, the repetition number can be a function of the MCS, that is as MCS level increases the repetition number decreases. For example, if the RNTI indicates that the transmission is to use the first set of parameters, the PUSCH transmission is repeated 4× and the PUCCH transmission is repeated 8×, however if the RNTI indicates that the transmission is to use the second set of parameters, the PUSCH transmission is repeated 2× and the PUCCH transmission is repeated 4×. At 26, the UE makes an uplink transmission with the applied repetitions.

Figure 7:
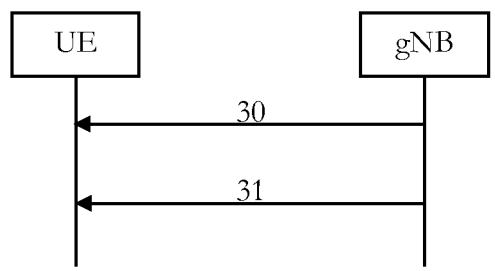
FIG. 7 illustrates an embodiment, where a repetition for a downlink is indicated based on the indication of the first and second set of uplink channel transmission parameters.

In an embodiment, as illustrated in FIG. 7, this scheme is also used in the downlink for PDSCH. Hence, in this case the respective sets of uplink channel transmission parameters as discussed herein are used to apply repetitions to the downlink channel. Hence, if the UE is indicated at 30 to use the first set of parameters, the PDSCH or PDCCH is repeated by a predetermined number for a downlink transmission at 31. This predetermined repetition number or set of predetermined repetition numbers can be RRC configured by the network or it can be tied to MCS level. In the case where a plurality of predetermined repetition numbers are configured, an additional field in the DCI can indicate which repetition number is used, wherein a new DCI format or field is used. In other embodiments, instead of using a new DCI format, the repetition number can be a function of the MCS, that is as MCS level increases the repetition number decreases. For example, if the RNTI indicates that the transmission is to use the first set of parameters, the PDSCH transmission is repeated 4× and the PDCCH transmission is repeated 8×, however if the RNTI indicates that the transmission is to use the second set of parameters, the PDSCH transmission is repeated 2× and the PDCCH transmission is repeated 4×.

Figure 8:
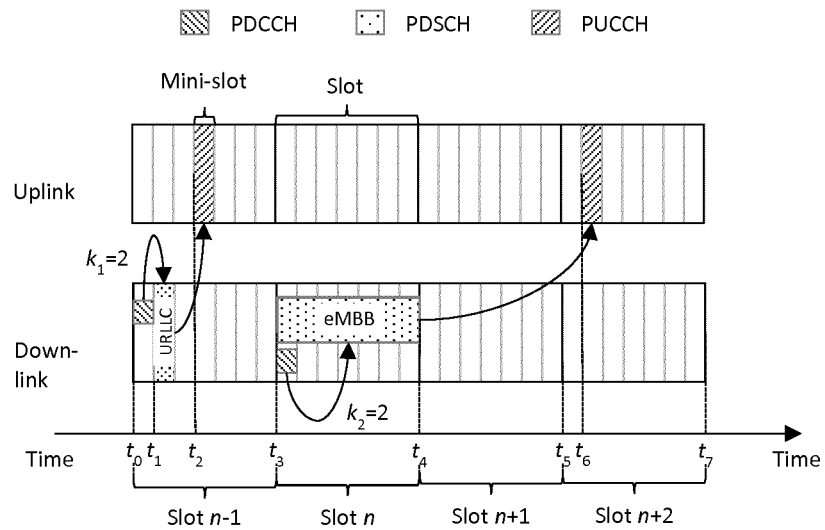
FIG. 8 illustrates an embodiment, where a delay is indicated based on the indication of the first and second set of uplink channel transmission parameters.

In another embodiment, the different sets of uplink channel transmission parameters for PUCCH (carrying the HARQ-ACK feedback for PDSCH) relate to a delay between the PDSCH and PUCCH. In Rel-15 NR, the DCI Format 1_0 and Format 1_1 carrying the DL grant that schedules PDSCH contains a three bit field "PDSCH-to-HARQ_feedback timing indicator" which tells the UE in which slot, relative to the PDSCH, the PUCCH is to be transmitted (see, for example, TS38.212, "NR: Multiplexing and channel coding (Release 15)"). Hence, if the PDSCH ends in slot n, the PUCCH is transmitted in slot n+k where k is indicated in this "PDSCH-to-HARQ_feedback timing indicator" field. The network will configure eight different k values and the DCI using three bits would point to one of these eight different k values. Since URLLC requires low latency and as in some embodiments, the PDSCH for URLLC has a duration of less than a slot (e.g. one mini-slot), the value k needs to be in a smaller unit, e.g. in mini-slots (two OFDM symbols) or in number of OFDM symbols. Thus, if the UE is indicated to use the first set of parameters, the "PDSCH-to-HARQ feedback timing indicator" uses a different set of k values. In other words, if the PDSCH carrying URLLC ends in a mini-slot (or OFDM symbol) m, the "PDSCH-to-HARQ_feedback timing indicator" indicates the value k where the PUCCH would be transmitted in mini-slot or OFDM symbol m+k. For illustrating this embodiment, FIG. 8 shows in an upper uplink section and a lower downlink section being divided into slots, which in turn are divided into mini-slots, and it illustrates exemplary that at time t0, the network transmits a DL grant to schedule a PDSCH for a URLLC UE at time $t_1$. At time $t_3$, the network transmits another DL grant to schedule another PDSCH for an eMBB UE in the same slot (slot n). Both DL grants indicate a "PDSCH-to-HARQ_feedback timing indicator" of 2 (i.e. for URLLC UE $k_1$=2 and for eMBB UE $k_2$=2). The eMBB UE would interpret $k_2$ using the $2^{nd}$ set of parameters, i.e. since the PDSCH ends in Slot n, the PUCCH is transmitted in Slot n+$k_2$, i.e. Slot n+2. However, for the URLLC UE, recognizing that the DL grant is for a URLLC transmission (e.g. via the RNTI, the length of PDSCH<2 mini-slots, etc.), it interprets $k_1$ using the $1^{st}$ set of parameters, i.e. the PUCCH is transmitted two mini-slots later, i.e. at time $t_2$.

Figure 9:
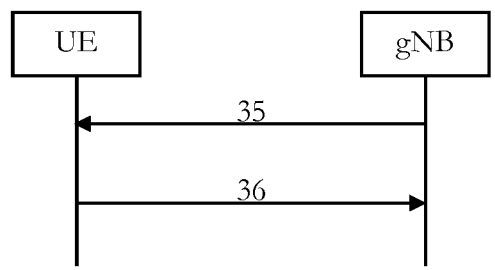
FIG. 9 illustrates an embodiment, where frequency hopping parameters are indicated based on the indication of the first and second set of uplink channel transmission parameters.
Figure 10:
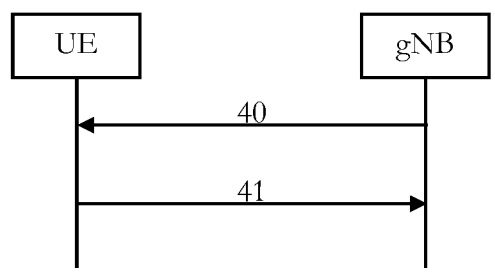
FIG. 10 illustrates an embodiment, where a transmit diversity scheme is indicated based on the indication of the first and second set of uplink channel transmission parameters.

In another embodiment, the (use of the) different sets of uplink channel transmission parameters indicate a frequency hopping pattern, as illustrated in FIG. 9. When a UE is indicated at 35 (by the eNodeB or gNB) to use the $1^{st}$ set of uplink channel transmission parameters, frequency hopping is always applied to the transmission at 36 and the frequency hops between mini-slots, whilst for the $2^{nd}$ set of transmission parameters, the frequency hopping is enabled by DCI or RRC signalling and the frequency hops between the adjacent slots. The frequency hopping pattern is configured by the network or predefined in specifications for the RAN for the different sets of transmission parameters. In a further embodiment, frequency hopping is used when repetition is configured. Although this is discussed for uplink transmission, in some embodiments the discussed frequency hopping is also applicable for the downlink PDSCH URLLC, such that the sets of uplink channel transmission parameters are accordingly used for indication of a corresponding frequency hopping pattern for the PDSCH URLLC In another embodiment, as illustrated in FIG. 10, the (use of the) different sets of uplink channel transmission parameters indicate a transmit diversity scheme. For example, when a UE is indicated at 40 to use the $1^{st}$ set of transmission parameters, transmit diversity is used for an uplink transmission at 41, in the other case not.

Figure 11:
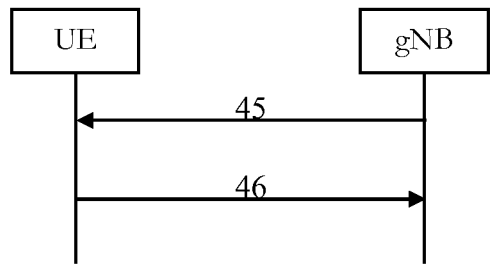
FIG. 11 illustrates an embodiment, where using piggyback is indicated based on the indication of the first and second set of uplink channel transmission parameters.

In another embodiment, as illustrated in FIG. 11, the (the use of the) different sets of uplink channel transmission parameters indicate to reject UCI (Uplink Control Information) piggybacking. In LTE, when a UCI carried by a PUCCH collides with a PUSCH transmission in the same UE, the UCI information is added to the PUSCH transmission, i.e. piggybacked. This avoids the UE from having to transmit two different physical channels at the same time, which has PAPR (Peak to Average Power Ratio) consequences. Since, URLLC requires high reliability, piggybacking additional information may reduce its performance, and, thus, if, for example, the use of the first set of uplink channel transmission parameters is indicated at 45, piggybacking is rejected for an uplink transmission at 46.

Moreover, for example, when a PUCCH collides with a PUSCH in the same UE and the PUSCH uses the $1^{st}$ set of uplink channel transmission parameters, piggybacking of the UCI onto the PUSCH is accepted if the number of UCI information bits is below a predetermined threshold, otherwise piggybacking is rejected. This predetermined threshold can be configured by the network or predefined in the specifications.

Figure 12:
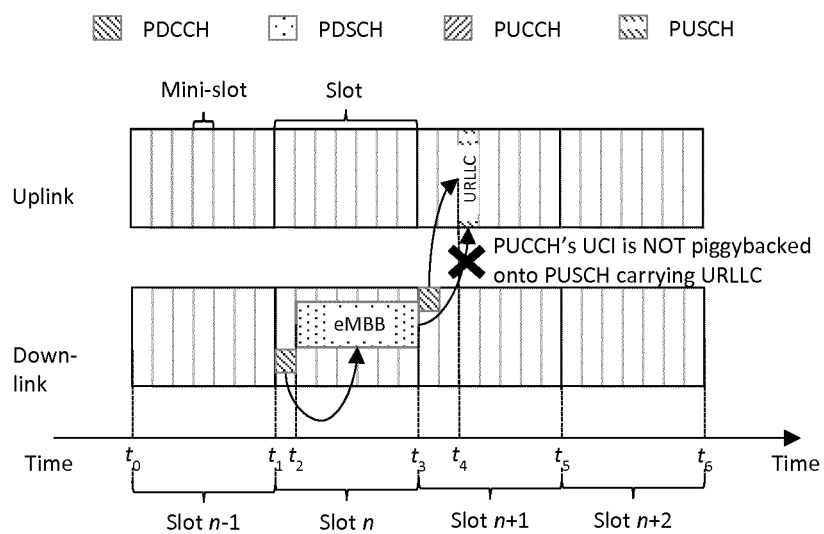
FIG. 12 illustrates another embodiment, where using piggyback is indicated based on the indication of the first and second set of uplink channel transmission parameters.

In another embodiment, when a PUCCH collides with a PUSCH in the same UE and the PUSCH uses the $1^{st}$ set of uplink channel transmission parameters, piggybacking of the UCI onto the PUSCH is rejected if the UCI is carried by a PUCCH using the $2^{nd}$ set of uplink channel transmission parameters. That is, the UCI carries the HARQ-ACK response for an eMBB PDSCH. An example for illustrating this embodiment is shown in FIG. 12, where in an upper section the uplink and in a lower section the downlink transmission is illustrated. At time $t_1$, the UE receives a DL grant for a PDSCH carrying an eMBB transmission where the corresponding PUCCH carrying the HARQ-ACK feedback is to be transmitted in the next slot at time $t_4$. This PUCCH uses the $2^{nd}$ set of uplink channel transmission parameters. At time $t_3$ the same UE receives an UL grant for a PUSCH for a URLLC transmission at time $t_4$ and this PUSCH transmission uses the $1^{st}$ set of uplink channel transmission parameters. This causes a collision between PUSCH and PUCCH in this embodiment, and since the PUCCH uses the $2^{nd}$ set of transmission parameters, the PUSCH transmission rejects piggybacking the UCI from the PUCCH.

Figure 13:
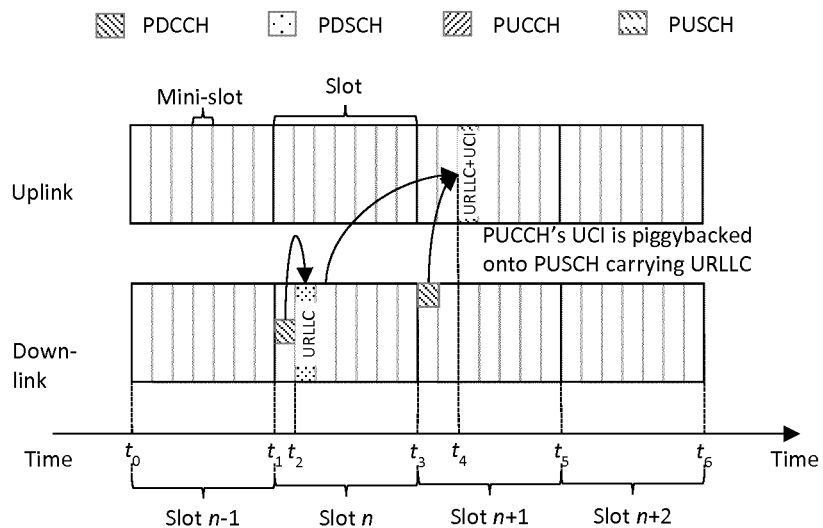
FIG. 13 illustrates another embodiment, where using piggyback is indicated based on the indication of the first and second set of uplink channel transmission parameters.

In another embodiment, when a PUCCH collides with a PUSCH in the same UE and the PUSCH uses the $1^{st}$ set of uplink channel transmission parameters, piggybacking of the UCI onto the PUSCH is accepted if the UCI is carried by a PUCCH using the $1^{st}$ set of uplink channel transmission parameters. That is if the UCI carries the HARQ-ACK response for a URLLC PDSCH. An example for illustrating this embodiment is shown in FIG. 13, where in an upper section the uplink and in a lower section the downlink transmission is illustrated. At time $t_1$, the UE receives a DL grant for a PDSCH carrying a URLLC transmission and the corresponding PUCCH carrying the HARQ-ACK feedback is to be transmitted at time $t_4$. This PUCCH uses the $1^{st}$ set of uplink channel transmission parameters. At time $t_3$ the same UE receives an UL grant for a PUSCH for a URLLC transmission at time $t_4$ and this PUSCH transmission uses the $1^{st}$ set of transmission parameters. This causes a collision between PUSCH and PUCCH and in this embodiment, since the PUCCH uses the $1^{st}$ set of uplink channel transmission parameters, the PUSCH transmission accepts piggybacking the UCI on the PUCCH.

Figure 14:
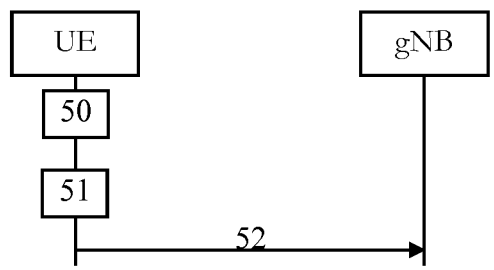
FIG. 14 illustrates an embodiment, where a priority of a PUSCH is indicated based on the indication of the first and second set of uplink channel transmission parameters.

In another embodiment, as illustrated in FIG. 14, when two PUSCHs collide at 50 in the same UE, the PUSCH using the $1^{st}$ set of uplink channel transmission parameters has higher priority than the PUSCH using the $2^{nd}$ set of uplink channel transmission parameters. The PUSCH using the $2^{nd}$ set of uplink channel transmission parameter is dropped or paused at 51 so that the PUSCH using the $1^{st}$ set of uplink channel transmission parameters can be transmitted at 52.

Figure 15:
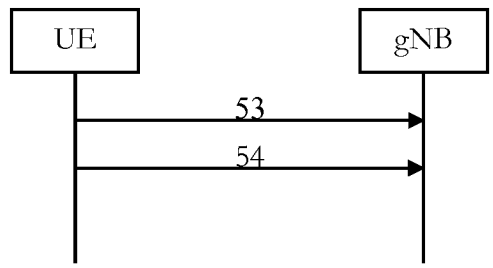
FIG. 15 illustrated an embodiment, where a later PUSCH is prioritized over an earlier PUSCH, wherein the two PUSCHs collide.

In another embodiment, as illustrated in FIG. 15, when two PUSCHs 53 and 54 collide in the same UE and these two PUSCH 53, 54 use the $1^{st}$ set of uplink channel transmission parameters, the later PUSCH 54 has higher priority than the earlier PUSCH 53. The earlier PUSCH 53 is dropped or paused so that the later PUSCH can be transmitted.

In another embodiment, when two PUCCHs collide in the same UE, the PUCCH using the $1^{st}$ set of uplink channel transmission parameters has higher priority than the PUCCH using the $2^{nd}$ set of uplink channel transmission parameters. The PUCCH using the $2^{nd}$ set of uplink channel transmission parameter is dropped or delayed so that the PUCCH using the $1^{st}$ set of uplink channel transmission parameters can be transmitted.

Figure 16:
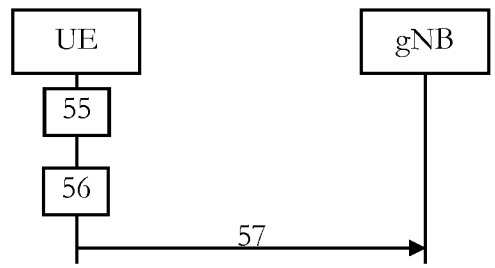
FIG. 16 illustrates an embodiment, where a priority of a PUCCH is indicated based on the indication of the first and second set of uplink channel transmission parameters.

In another embodiment, as illustrated in FIG. 16, when two PUCCHs using the $1^{st}$ set of uplink channel transmission parameters collide at 55, a joint coded UCI is transmitted using a PUCCH. Hence, the UCI information of both PUCCHs are joint coded at 56 so that information in both UCIs are transmitted without delay. This joint coded UCI PUCCH is transmitted at 57 using the $1^{st}$ set of uplink channel transmission parameters.

As mentioned, a different MCS table may be used for URLLC transmission compared to other types of transmission, and in some embodiments other (additional) transmission parameters that are used differently for URLLC transmission are introduced.

Figure 17:
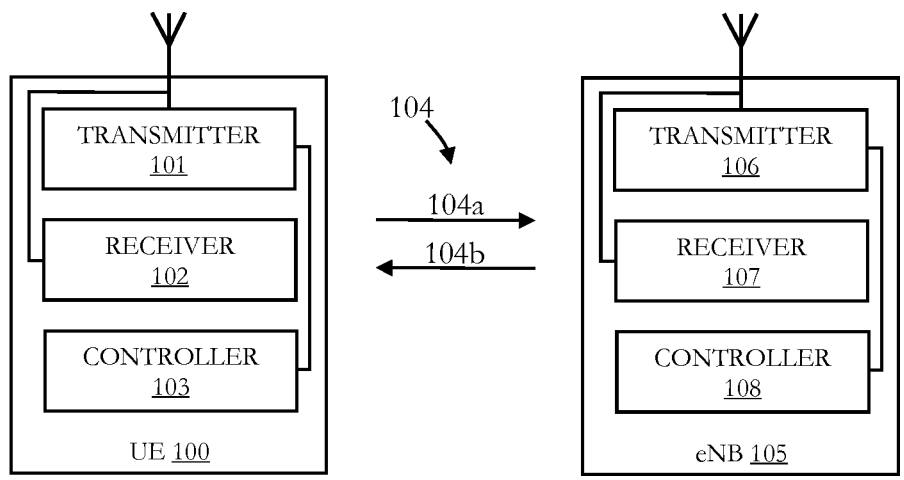
FIG. 17 illustrates an embodiment of a user equipment and a base station.

An embodiment of a UE 100 and an eNB 105 (or NR eNB/gNB) and a communications path 104 between the UE 100 and the eNB 105, which are used for implementing embodiments of the present disclosure, is discussed under reference of FIG. 17.

The UE 100 has a transmitter 101, a receiver 102 and a controller 103, wherein, generally, the technical functionality of the transmitter 101, the receiver 102 and the controller 103 are known to the skilled person, and, thus, a more detailed description of them is omitted.

The eNB 105 has a transmitter 106, a receiver 107 and a controller 108, wherein also here, generally, the functionality of the transmitter 106, the receiver 107 and the controller 108 are known to the skilled person, and, thus, a more detailed description of them is omitted.

The communication path 104 has an uplink path 104*a*, which is from the UE 100 to the eNB 105, and a downlink path 104*b*, which is from the eNB 105 to the UE 100.

During operation, the controller 103 of the UE 100 controls the reception of downlink signals over the downlink path 104*b* at the receiver 102 and the controller 103 controls the transmission of uplink signals over the uplink path 104*a* via the transmitter 101.

Similarly, during operation, the controller 108 of the eNB 105 controls the transmission of downlink signals over the downlink path 104*b* over the transmitter 106 and the controller 108 controls the reception of uplink signals over the uplink path 104*a* at the receiver 107.

Figure 18:
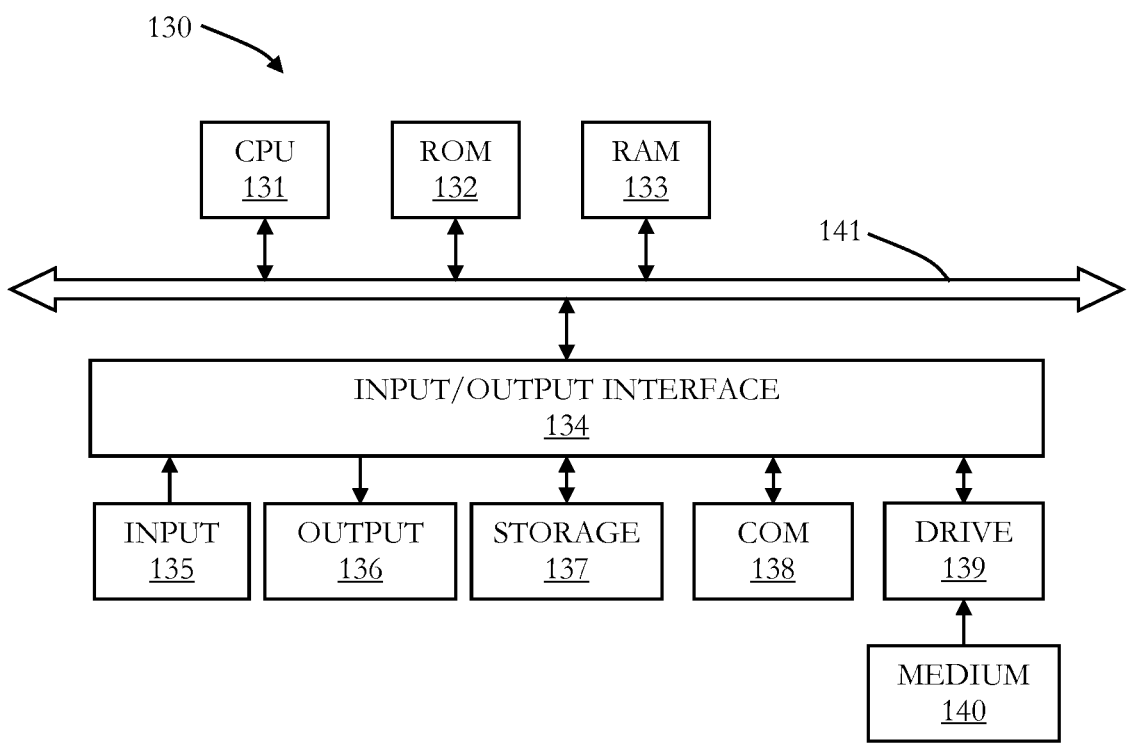
FIG. 18 illustrates a multi-purpose computer which can be used for implementing a user equipment or a base station.

In the following, an embodiment of a general purpose computer 130 is described under reference of FIG. 18. The computer 130 can be implemented such that it can basically function as any type of base station or new radio base station, transmission and reception point, or user equipment as described herein. The computer has components 131 to 141, which can form a circuitry, such as any one of the circuitries of the base stations, and user equipment, as described herein.

Embodiments which use software, firmware, programs or the like for performing the methods as described herein, can be installed on computer 130, which is then configured to be suitable for the concrete embodiment.

The computer 130 has a CPU 131 (Central Processing Unit), which can execute various types of procedures and methods as described herein, for example, in accordance with programs stored in a read-only memory (ROM) 132, stored in a storage 137 and loaded into a random access memory (RAM) 133, stored on a medium 140 which can be inserted in a respective drive 139, etc.

The CPU 131, the ROM 132 and the RAM 133 are connected with a bus 141, which in turn is connected to an input/output interface 134. The number of CPUs, memories and storages is only exemplary, and the skilled person will appreciate that the computer 130 can be adapted and configured accordingly for meeting specific requirements which arise, when it functions as a base station or as user equipment.

At the input/output interface 134, several components are connected: an input 135, an output 136, the storage 137, a communication interface 138 and the drive 139, into which a medium 140 (compact disc, digital video disc, compact flash memory, or the like) can be inserted.

The input 135 can be a pointer device (mouse, graphic table, or the like), a keyboard, a microphone, a camera, a touchscreen, etc.

The output 136 can have a display (liquid crystal display, cathode ray tube display, light emittance diode display, etc.), loudspeakers, etc.

The storage 137 can have a hard disk, a solid state drive and the like.

The communication interface 138 can be adapted to communicate, for example, via a local area network (LAN), wireless local area network (WLAN), mobile telecommunications system (GSM, UMTS, LTE, NR etc.), Bluetooth, infrared, etc.

It should be noted that the description above only pertains to an example configuration of computer 130. Alternative configurations may be implemented with additional or other sensors, storage devices, interfaces or the like. For example, the communication interface 138 may support other radio access technologies than the mentioned UMTS, LTE and NR.

When the computer 130 functions as a base station, the communication interface 138 can further have a respective air interface (providing e.g. E-UTRA protocols OFDMA (downlink) and SC-FDMA (uplink)) and network interfaces (implementing for example protocols such as S1-AP, GTP-U, S1-MME, X2-AP, or the like). Moreover, the computer 130 may have one or more antennas and/or an antenna array. The present disclosure is not limited to any particularities of such protocols.

The methods as described herein are also implemented in some embodiments as a computer program causing a computer and/or a processor and/or circuitry to perform the method, when being carried out on the computer and/or processor and/or circuitry. In some embodiments, also a non-transitory computer-readable recording medium is provided that stores therein a computer program product, which, when executed by a processor and/or circuitry, such as the processor and/or circuitry described above, causes the methods described herein to be performed.

It should be recognized that the embodiments describe methods with an exemplary order of method steps. The specific order of method steps is, however, given for illustrative purposes only and should not be construed as binding.

All units and entities described in this specification and claimed in the appended claims can, if not stated otherwise, be implemented as integrated circuit logic, for example on a chip, and functionality provided by such units and entities can, if not stated otherwise, be implemented by software.

In so far as the embodiments of the disclosure described above are implemented, at least in part, using a software-controlled data processing apparatus, it will be appreciated that a computer program providing such software control and a transmission, storage or other medium by which such a computer program is provided are envisaged as aspects of the present disclosure.

Note that the present technology can also be configured as described below.

(1) A base station for a mobile telecommunications system comprising circuitry configured to communicate with at least one user equipment, wherein the circuitry is further configured to:
  indicate use of a first set of uplink channel transmission parameters and a second set of uplink channel transmission parameter for use by the at least one user equipment for a data transmission.
(2) The base station of (1), wherein the first set of uplink channel transmission parameters refers to a short data transmission and the second set of uplink channel transmission parameters refers to a long data transmission.
(3) The base station of (1) or (2), wherein the use of the first set and the second set of uplink channel transmission parameters is indicated based on at least one of the following: radio network temporary identifier, downlink control information format, physical downlink control channel control resource set, search space, usage of grant free resource for a physical uplink shared channel, occupation of number of slots, radio resource control.
(4) The base station of (1) or (2), wherein the use of the first set and the second set of uplink channel transmission parameters is implicitly indicated based on a signaled physical uplink control channel resource and based on at least one of the following: physical uplink control channel resource set identification, physical uplink control channel resource identification, group of resource identifications.
(5) The base station of anyone of (1) to (4), wherein the first and second sets of uplink channel transmission parameters are associated with a power control parameter.
(6) The base station of anyone of (1) to (5), wherein the first and the second sets of uplink channel transmission parameters are associated with different physical uplink control channel resources.
(7) The base station of anyone of (1) to (6), wherein the first and second sets of uplink channel transmission parameters are associated with a repetition to be used in an uplink or a downlink transmission.
(8) The base station of anyone of (1) to (7), wherein the first and second sets of uplink channel transmission parameters are associated with a delay for at least one of: physical downlink shared channel and physical uplink control channel.
(9) The base station of anyone of (1) to (8), wherein the first and second sets of uplink channel transmission parameters are associated with a frequency hopping pattern.
(10) The base station of anyone of (1) to (9), wherein the first and second sets of uplink channel transmission parameters are associated with a transmit diversity scheme.
(11) The base station of anyone of (1) to (10), wherein the first and second sets of uplink channel transmission parameters are associated with whether piggybacking is used.
(12) The base station of (11), wherein usage of piggybacking of uplink control information is indicated.
(13) The base station of (12), wherein piggybacking of uplink control information is not used if the use of the first set of uplink channel transmission parameters is indicated for the data transmission.
(14) The base station of (12), wherein piggybacking of uplink control information is used if the use of the first set of uplink channel transmission parameters is indicated for the data transmission and the amount of uplink control information is below a threshold.
(15) The base station of (12), wherein piggybacking of uplink control information is not used when the use of the first set of uplink channel transmission parameters is indicated for the data transmission and when the uplink control information is carried by a physical uplink control channel using the second set of uplink channel transmission parameters.
(16) The base station of (12), wherein piggybacking of uplink control information is used when the use of the first set of uplink channel transmission parameters is indicated for the data transmission and when the uplink control information is carried by a physical uplink control channel using the first set of uplink channel transmission parameters.
(17) The base station of anyone of (1) to (16), wherein, when two physical uplink shared channels collide, the physical uplink shared channel using the first set of uplink channel transmission parameters has priority over the physical uplink shared channel using the second set of uplink channel transmission parameters.
(18) The base station of anyone of (1) to (18), wherein, when two physical uplink shared channels collide and the two physical uplink shared channels use the first set of uplink channel transmission parameters, the later physical uplink shared channel has priority over the earlier physical uplink shared channel.
(19) The base station of anyone of (1) to (18), wherein, when two physical uplink control channels collide, the physical uplink control channel using the first set of uplink channel transmission parameters has priority over the physical uplink control channel using the second set of uplink channel transmission parameters.
(20) The base station of anyone of (1) to (19), wherein, when two physical uplink control channels using the first set of uplink channel transmission parameters collide, uplink control information of both physical uplink control channels are jointly coded into a single physical uplink control channels transmission.
(21) A user equipment for a mobile telecommunications system comprising circuitry configured to communicate with at least one base station, wherein the circuitry is further configured to:

receive an indication of use of a first set of uplink channel transmission parameters and a second set of uplink channel transmission parameters for a data transmission.
(22) The user equipment of (21), wherein the first set of uplink channel transmission parameters refers to a short data transmission and the second set of uplink channel transmission parameters refers to a long data transmission.
(23) The user equipment of (21) or (22), wherein the use of the first set and the second set of uplink channel transmission parameters is indicated based on at least one of the following: radio network temporary identifier, downlink control information format, physical downlink control channel control resource set, search space, usage of grant free resource for a physical uplink shared channel, occupation of number of slots, radio resource control.
(24) The user equipment of (21) or (22), wherein the use of the first set and the second set of uplink channel transmission parameters is implicitly indicated based on a signaled physical uplink control channel resource and based on at least one of the following: physical uplink control channel resource set identification, physical uplink control channel resource identification, group of resource identifications.
(25) The user equipment of anyone of (21) to (24), wherein the first and second sets of uplink channel transmission parameters are associated with a power control parameter.
(26) The user equipment of anyone of (21) to (25), wherein the first and the second sets of uplink channel transmission parameters are associated with different physical uplink control channel resources.
(27) The user equipment of anyone of (21) to (26), wherein the first and second sets of uplink channel transmission parameters are associated with a repetition to be used in an uplink or a downlink transmission.
(28) The user equipment of anyone of (21) to (27), wherein the first and second sets of uplink channel transmission parameters are associated with a delay for at least one of: physical downlink shared channel and physical uplink control channel.
(29) The user equipment of anyone of (21) to (28), wherein the first and second sets of uplink channel transmission parameters are associated with a frequency hopping pattern.
(30) The user equipment of anyone of (21) to (29), wherein the first and second sets of uplink channel transmission parameters are associated with a transmit diversity scheme.
(31) The user equipment of anyone of (21) to (30), wherein the first and second sets of uplink channel transmission parameters are associated with whether piggybacking is used.
(32) The user equipment of anyone of (21) to (30), wherein usage of piggybacking of uplink control information is indicated.
(33) The user equipment of (32), wherein piggybacking of uplink control information is not used if the use of the first set of uplink channel transmission parameters is indicated for the data transmission.
(34) The user equipment of (32), wherein piggybacking of uplink control information is used if the use of the first set of uplink channel transmission parameters is indicated for the data transmission and the amount of uplink control information is below a threshold.
(35) The user equipment of (32), wherein piggybacking of uplink control information is not used when the use of the first set of uplink channel transmission parameters is indicated for the data transmission and when the uplink control information is carried by a physical uplink control channel using the second set of uplink channel transmission parameters.
(36) The user equipment of (32), wherein piggybacking of uplink control information is used when the use of the first set of uplink channel transmission parameters is indicated for the data transmission and when the uplink control information is carried by a physical uplink control channel using the first set of uplink channel transmission parameters.
(37) The user equipment of anyone of (21) to (36), wherein, when two physical uplink shared channels collide, the physical uplink shared channel using the first set of uplink channel transmission parameters has priority over the physical uplink shared channel using the second set of uplink channel transmission parameters.
(38) The user equipment of anyone of (21) to (37), wherein, when two physical uplink shared channels collide and the two physical uplink shared channels use the first set of uplink channel transmission parameters, the later physical uplink shared channel has priority over the earlier physical uplink shared channel.
(39) The user equipment of anyone of (21) to (37), wherein, when two physical uplink control channels collide, the physical uplink control channel using the first set of uplink channel transmission parameters has priority over the physical uplink control channel using the second set of uplink channel transmission parameters.
(40) The user equipment of anyone of (21) to (38), wherein, when two physical uplink control channels using the first set of uplink channel transmission parameters collide, uplink control information of both physical uplink control channels are jointly coded into a single physical uplink control channels transmission.
(41) A circuitry for a base station, in particular for a base station according to anyone of (1) to (20), for a mobile telecommunications system configured to communicate with at least one user equipment, wherein the circuitry is further configured to:
indicate use of a first set of uplink channel transmission parameters and a second set of uplink channel transmission parameter for use by the at least one user equipment for a data transmission.
(42) A circuitry for a user equipment, in particular for a user equipment according to anyone of (21) to (40), for a mobile telecommunications system configured to communicate with at least one base station, wherein the circuitry is further configured to:
receive an indication of use of a first set of uplink channel transmission parameters and a second set of uplink channel transmission parameters for a data transmission.
(43) A mobile telecommunications system configured to provide communication between at least one base station and at least one user equipment, wherein
the at least one base station, in particular according to anyone of (1) to (20), comprises circuitry configured to indicate use of a first set of uplink channel transmission parameters and a second set of uplink channel transmission parameter for use by the at least one user equipment for a data transmission, and wherein the at least one user equipment, in particular according to anyone of (21) to (40), comprises circuitry configured to receive an indication of use of a first set of uplink channel transmission parameters and a second set of uplink channel transmission parameters for the data transmission.

(44) A mobile telecommunications system method for providing communication between at least one base station and at least one user equipment, comprising:

indicating use of a first set of uplink channel transmission parameters and a second set of uplink channel transmission parameter for use by the at least one user equipment for a data transmission; or receiving an indication of use of a first set of uplink channel transmission parameters and a second set of uplink channel transmission parameters for the data transmission.

The invention claimed is:

1. A base station for a mobile telecommunications system, the base station comprising:
   circuitry configured to
   communicate with at least one user equipment (UE); and
   indicate use of a first set of uplink channel transmission parameters and a second set of uplink channel transmission parameters for use by the at least one UE for a data transmission, wherein
   the first and second sets of uplink channel transmission parameters are associated with a power control parameter via downlink control information (DCI) for physical uplink shared channel (PUSCH),
   the first set of uplink channel transmission parameters is targeted at and used for Ultra Reliable & Low Latency Communications (URLLC) transmission,
   the second set of uplink channel transmission parameters is targeted at and used for Enhanced Mobile Broadband (eMBB) transmission different from the URLLC transmission,
   transmission parameters in the first set of uplink channel transmission parameters are different than transmission parameters in the second set of uplink channel transmission parameters,
   in a case that URLLC data transmission of the at least one UE on the PUSCH collides with an eMBB data transmission of another UE on the PUSCH, power applied to the PUSCH using the first set of uplink channel transmission parameters is increased by an offset amount relative to power applied to the PUSCH using the second set of uplink channel transmission parameters,
   the offset amount is indicated by the power control parameter and the offset amount is radio resource control (RRC) configured.

2. The base station of claim 1, wherein the first set of uplink channel transmission parameters refers to a short data transmission and the second set of uplink channel transmission parameters refers to a long data transmission.

3. The base station of claim 1, wherein the use of the first set and the second set of uplink channel transmission parameters is indicated based on at least one of the following:
   radio network temporary identifier,
   DCI format,
   physical downlink control channel control resource set,
   search space,
   usage of grant free resource for a PUSCH,
   occupation of a number of slots, and
   radio resource control.

4. The base station of claim 1, wherein the use of the first set and the second set of uplink channel transmission parameters is implicitly indicated based on a signaled physical uplink control channel (PUCCH) resource and based on at least one of the following:
   PUCCH resource set identification,
   PUCCH resource identification, and
   group of resource identifications.

5. The base station of claim 1, wherein the first and the second sets of uplink channel transmission parameters are associated with different physical uplink control channel resources.

6. The base station of claim 1, wherein the first and second sets of uplink channel transmission parameters are associated with a repetition to be used in an uplink or a downlink transmission.

7. The base station of claim 1, wherein the first and second sets of uplink channel transmission parameters are associated with a delay for at least one of:
   physical downlink shared channel, and
   physical uplink control channel.

8. The base station of claim 1, wherein the first and second sets of uplink channel transmission parameters are associated with a frequency hopping pattern.

9. The base station of claim 1, wherein the first and second sets of uplink channel transmission parameters are associated with a transmit diversity scheme.

10. The base station of claim 1, wherein the first and second sets of uplink channel transmission parameters are associated with whether piggybacking is used.

11. The base station of claim 10, wherein usage of piggybacking of uplink control information is indicated.

12. The base station of claim 11, wherein piggybacking of uplink control information is not used if the use of the first set of uplink channel transmission parameters is indicated for the data transmission.

13. The base station of claim 11, wherein piggybacking of uplink control information is used if the use of the first set of uplink channel transmission parameters is indicated for the data transmission and the amount of uplink control information is below a threshold.

14. The base station of claim 11, wherein piggybacking of uplink control information is not used when the use of the first set of uplink channel transmission parameters is indicated for the data transmission and when the uplink control information is carried by a physical uplink control channel using the second set of uplink channel transmission parameters.

15. The base station of claim 11, wherein piggybacking of uplink control information is used when the use of the first set of uplink channel transmission parameters is indicated for the data transmission and when the uplink control information is carried by a physical uplink control channel using the first set of uplink channel transmission parameters.

16. The base station of claim 1, wherein when two physical uplink shared channels collide, a PUSCH using the first set of uplink channel transmission parameters has priority over a PUSCH using the second set of uplink channel transmission parameters.

17. The base station of claim 1, wherein when two PUSCHs collide and the two PUSCHs use the first set of uplink channel transmission parameters, a later PUSCH of the two PUSCHs has priority over an earlier PUSCH of the two PUSCHs.

18. The base station of claim 1, wherein when two physical uplink control channels (PUCCH) collide, a PUCCH using the first set of uplink channel transmission parameters has priority over a PUCCH using the second set of uplink channel transmission parameters.

19. The base station of claim 1, wherein when two physical uplink control channels (PUCCH) using the first set of uplink channel transmission parameters collide, uplink control information of both PUCCHs are jointly coded into a single PUCCH transmission.

* * * * *